United States Patent

[11] 3,603,603

[72] Inventor Leslie A. Woodson
 Long Beach, Calif.
[21] Appl. No. 858,393
[22] Filed Sept. 16, 1969
[45] Patented Sept. 7, 1971
[73] Assignee W. S. Shamban & Co.
 Los Angeles, Calif.

[54] ROTATING SEAL ASSEMBLY
 14 Claims, 3 Drawing Figs.
[52] U.S. Cl............................................. 277/165,
 277/83
[51] Int. Cl........................................... F16j 15/54
[50] Field of Search............................. 277/164,
 165, 81, 81 R, 83, 84

[56] References Cited
 UNITED STATES PATENTS
2,789,847  4/1957  Jackson..................  277/84

FOREIGN PATENTS
512,372  9/1939  Great Britain...............  277/83
759,233  10/1956  Great Britain...............  277/165
767,784  2/1957  Great Britain...............  277/165
1,166,648  6/1958  France........................  277/165

OTHER REFERENCES
Huffman, Slipper Seals: O-rings with " Teflon" for low wear; The Journal of Teflon Vol. 5 No. 4 May 1964 page 7 relied upon.

Primary Examiner—Robert I. Smith
Attorney—Smyth, Roston & Pavitt

ABSTRACT: A seal assembly for use between relatively rotatable inner and outer members. The seal assembly rotates relative to both the inner and outer members at a velocity intermediate the velocities of the inner and outer members.

PATENTED SEP 7 1971

3,603,603

INVENTOR
LESLIE A. WOODSON
BY
Smyth, Roston & Pavitt
ATTORNEYS

ROTATING SEAL ASSEMBLY

BACKGROUND OF THE INVENTION

In a typical seal installation it is desirable to seal between a rotatable shaft and an outer member surrounding the shaft. A seal assembly which may be in the form of an O-ring is positioned in a seal groove in the member and when the shaft rotates, the seal and the outer member remain stationary with the shaft rubbing against the seal assembly.

One persistent problem is that the seal assembly wears quite rapidly. Specifically, an elastomeric seal ring such as the conventional O-ring wears very rapidly if placed in rubbing contact between relatively movable surfaces. To reduce wear on the elastomeric ring it has been proposed to use a slipper seal. The slipper seal is placed between the O-ring and the rotatable shaft and the O-ring is, therefore, isolated from rubbing contact with the shaft. The slipper seal is usually constructed of a plastic material such as polytetrafluoroethylene which is more wear resistant than the elastomeric material of the O-ring.

Notwithstanding the use of slipper seals, the wear problem still exists because the slipper seals are, themselves, subject to wear. Specifically, it has been found that slipper seal wear is very rapid when shaft velocity, as measured in surface feet per unit of time past the slipper seal exceeds a predetermined limit. For example, a velocity of 500 surface feet per minute is the maximum velocity which a polytetrafluoroethylene slipper seal can tolerate without experiencing extremely rapid wear. The result is that the shaft speed must be held below a specified limit, or if shaft speed is increased beyond acceptable limits, the wear of a slipper seal progresses much more rapidly.

SUMMARY OF THE INVENTION

The present invention substantially increases seal life and/or permits substantial increase in shaft rotational velocity without increasing seal wear. This is accomplished by causing the seal assembly to rotate relative to both the shaft member and the outer member at a velocity intermediate the velocities of the members. With this construction, the relative velocity between the seal assembly and the members is less than it would be if the seal assembly was fixed to one of the members. By reducing the relative velocity, the wear on the seal is correspondingly reduced. In addition, shaft speed can be increased beyond the limits imposed by prior art seal assemblies.

For maximum wear life, the velocity of the seal assembly relative to the outer member as measured in surface feet per minute should be about equal to the velocity of the seal assembly relative to the shaft as measured in surface feet per minute. This causes the seal assembly to wear evenly on the inner and outer circumferential surfaces thereof to thereby maximize seal life. Of course, the seal assembly velocity may be varied with the amount of wear distribution depending upon the velocity of the seal assembly relative to the shaft and outer member.

The seal assembly of this invention preferably includes a slipper seal which engages both the shaft and the outer member. The slipper seal may be constructed of a low coefficient of friction plastic material such as polytetrafluoroethylene. The slipper seal is caused to rotate by controlling the surface finish on the surfaces of the shaft and the outer member which engage the slipper seal. Thus, seal assembly rotation is controlled by controlling the frictional forces acting on the seal assembly.

The slipper seal is preferably loaded into sealing engagement with the walls of the seal groove. This is preferably accomplished by a resilient element such as an elastomeric sealing ring. The slipper seal should isolate the elastomeric sealing ring from rubbing contact with the shaft or outer member.

In one preferred form of the invention, two seal units are provided in the seal groove with each of the seal units being held in axially spaced relationship by a retainer element. Each of the seal units preferably includes a slipper seal and one or more elastomeric sealing rings. With the seal units being held in axially spaced relationship, a fluid can be passed through the space between the seal units. This arrangement is useful, for example, in certain pumping operations.

The invention, both as to its organization and method of operation together with further features and advantages thereof, may best be understood by reference to the following description taken in connection with the accompanying illustrative drawing:

DESCRIPTION OF THE PREFERRED EMBODIMENT

Figure 1:
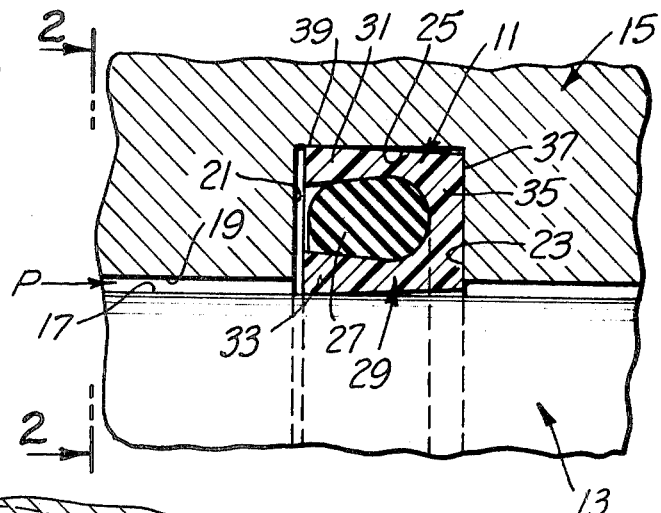
FIG. 1 is a fragmentary sectional view taken on an axial plane and illustrating a first form of seal assembly constructed in accordance with the teachings of this invention.

Referring to the drawing and in particular to FIG. 1 thereof, reference numeral 11 designates a seal assembly constructed in accordance with the teachings of this invention. The seal assembly 11 is adapted for use between a rotatable shaft 13 and an outer member 15 which, in the embodiment illustrated, surrounds the shaft 13. The seal 11 is effective to prevent fluid under pressure acting in the direction of the arrow P (FIG. 1) from passing through the seal assembly.

The shaft 13 may be of conventional construction and be suitably mounted for rotation relative to the outer member 15. Ordinarily, the outer member 15 will be stationary; however, the seal assembly 11 can be utilized with either or both of the shaft 13 and the outer member 15 being rotatable. Similarly, the seal assembly 11 can be utilized regardless of the direction of rotation of the shaft 13 and/or the outer member 15.

The shaft 13 has a cylindrical outer surface 17 and the member 15 has an inner cylindrical surface 19 which confronts the surface 17. The outer member 15 also has a pair of axially spaced radial walls 21 and 23 interconnected by a circumferential wall 25 which cooperate to define a seal groove in which the seal assembly 11 is positioned. If desired, the seal groove could be formed in the shaft 13 in lieu of the outer member 15.

Figure 2:
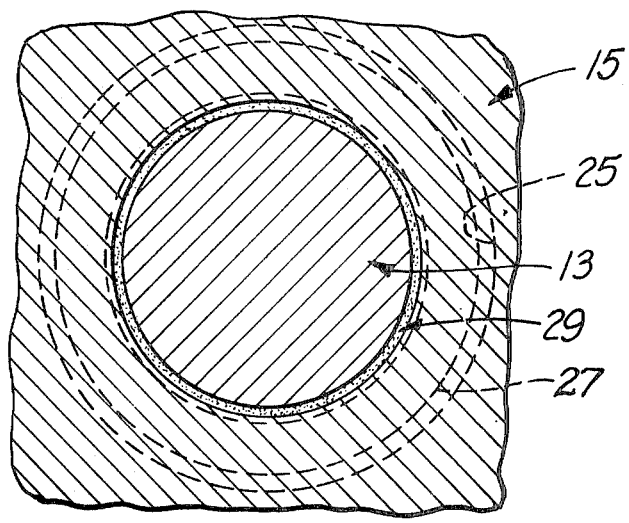
FIG. 2 is a sectional view taken generally along line 2—2 of FIG. 1.

The seal assembly 11 includes a resilient ring 27 and a slipper seal 29. The resilient ring 27 and the slipper seal 29 are continuous sealing elements which completely circumscribe the shaft 13 as clearly shown in FIG. 2. In the embodiment illustrated, the resilient ring 27 is in the form of an elastomeric O-ring and the slipper seal 29 is generally U- or channel-shaped in axial cross section with the U opening toward the radial wall 21. The slipper seal 29 is preferably constructed of a somewhat deformable plastic material having good wear qualities such as polytetrafluoroethylene.

As shown in FIG. 1, the slipper seal 29 includes a pair of legs 31 and 33 integrally interconnected by a radially extending web 35 all of which cooperate to define the U-shaped slipper seal 29. In the position shown in FIG. 1 the inner surface of the legs 31 and 33 converge as they extend toward the opening of the U to thereby retain the resilient ring 27 within the slipper seal 29. The resilient ring 27 is squeezed between the legs 31 and 33 and engages the web 35. The web 35 has an outer surface 37 which engages the radial wall 23 and the legs 31 and 33 have outer surfaces 39 and 41, respectively, which engage the circumferential wall 25 and the outer surface 17.

Prior to its insertion into the seal groove, the outer surfaces of the legs 31 and 33 of the slipper seal 29 diverge slightly and the inner surfaces of the legs are substantially parallel in axial cross section. In the relaxed condition the resilient ring 27 is substantially circular in axial cross section, although other cross-sectional configurations could be used. When the seal assembly 11 is in the position shown in FIG. 1, the legs 31 and 33 are deflected slightly toward each other with the result that the surfaces 39 and 41 are caused to engage, with some pressure, the radial wall 25 and the outer surface 17, respectively. In addition, the cross section of the resilient ring 27 is compressed so that the resilient ring further urges the surfaces 39 and 41 into tight sealing engagement with the radial wall 25 and the outer surface 17, respectively.

The seal assembly 11 can be dynamically loaded by the fluid under pressure which travels between the surfaces 17 and 19 to act on the left end of the seal assembly 11. This causes the surfaces 39 and 41 to more tightly engage the radial wall 25 and the surface 17, respectively. The surface 39 and 41 form radially thin annular gaps with the radial wall 25 and the surface 17 as shown in FIG. 1 at regions adjacent the right hand end of the seal assembly 11.

A feature of this invention is that the seal assembly 11 rotates relative to the shaft 13 and the outer member 15 at a speed intermediate the speeds of the shaft and the outer member. This desirable result is accomplished, in this embodiment of the invention, by controlling the surface finish on the radial wall 23, the circumferential wall 25 and the outer surface 17. By so doing, the force of friction acting between the seal assembly 11 and the shaft 13 and between the seal assembly 11 and the outer member 15 can be controlled. By controlling the force of friction acting on the seal assembly 11, the movement of the seal assembly 11 can also be controlled. The particular surface finish selected will, therefore, depend upon various conditions such as the materials from which the shaft 13, the outer member 15 and the slipper seal 29 are constructed and also the force with which the slipper seal is urged against the surface 17 and the walls 23 and 25. By way of illustration, with a polytetrafluoroethylene slipper seal, an 8 to 16 microinch finish has been found satisfactory.

Because of construction tolerances and variations in pressure to which the seal assembly 11 will be subjected, laboratory accuracy as to the speed of rotation of the seal assembly 11 should not be anticipated. In some instances, the seal assembly 11 may rotate intermittently. In any event, for optimum results the seal assembly 11 should rotate at such a speed that the wear on the surfaces 39 and 41 are substantially equal. Theoretically this means that the number of surface feet per minute of the member 15 which passes the surface 39 should equal the number of surface feet per minute of the surface 17 which passes the surface 41. Because of the variation in diameters of the wall 25 and the surface 17, for optimum results, the seal assembly 11 should rotate at slightly less than one-half the rotational speed of the shaft (assuming that the shaft 13 rotates and the outer member 15 is stationary). A close approximation of the optimum conditions is obtained with the seal assembly rotating at one-half shaft speed.

Figure 3:
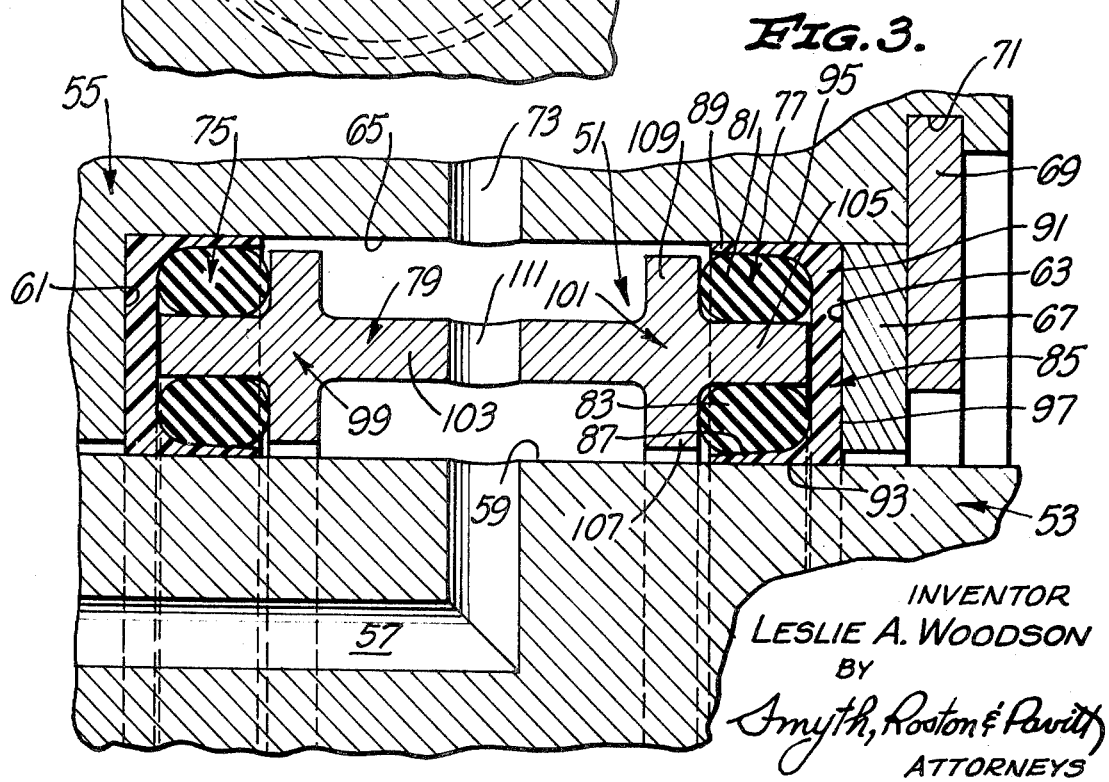
FIG. 3 is a fragmentary sectional view similar to FIG. 1 illustrating a second form of the present invention.

FIG. 3 shows a ringlike seal assembly 51 which is similar to the seal assembly 11 in that it rotates relative to a shaft 53 and an outer member 55. The shaft 53 may be identical to the shaft 13 except the former has a passage 57 extending therethrough. In the embodiment illustrated, the shaft 57 has a radially extending portion which opens at an outer cylindrical surface 59 of the shaft and an axially extending portion which may open at some other surface region of the shaft.

The outer member 55 surrounds the shaft 53 and has axially spaced radial walls 61 and 63 interconnected by a circumferential wall 65 all of which cooperate to define an annular seal groove. In the embodiment shown in FIG. 3, the radial wall 63 is defined by a removable ring 67 which is held in position by a retaining ring 69 which is suitably retained within a groove 71 of the outer member 55. The outer member 55 has a passage 73 which opens at the circumferential wall 65.

The seal assembly 51 includes seal units 75 and 77 which are maintained in axially spaced relationship by a retainer 79. As the seal units 75 and 77 are identical, only the seal unit 77 is described in detail herein.

The seal unit 77 includes an outer resilient ring 81, an inner resilient ring 83 and an annular slipper seal 85. Each of the rings 81 and 83 may be elastomeric sealing rings which are identical to the resilient ring 27 (FIG. 1). The slipper seal 85 includes an inner leg 87 and an outer leg 89 integrally interconnected by a web 91. The legs 87 and 89 have circumferential surfaces 93 and 95, respectively, and the web 91 has an outer surface 97. The slipper seal 85 may be constructed of the same material as the slipper seal 29.

The retainer 79 is preferably an integral tubular element which extends completely around the shaft 53. The retainer 79 includes a pair of retaining sections 99 and 101 located at opposite ends of the retainer and separated by a web 103. The retaining sections 99 and 101 are identical and only the retaining section 101 is described in detail. The retaining section 101 includes an axial flange 105, an inner radial flange 107 and an outer radial flange 109. The flange 105 radially separates the resilient ring 81 and 83 and the radial flanges 107 and 109 retain the resilient rings 83 and 81, respectively, against axial movement to the left as viewed in FIG. 3. Thus, the retaining section 101 cooperates with the slipper seal 85 to substantially completely enclose both of the resilient rings 81 and 83. The web 103 has one or more apertures 111 extending generally radially therethrough to thereby provide communication between the passages 57 and 73.

One feature of the construction shown in FIG. 3 is that a fluid can be passed from the exterior of the outer member 55 through the seal assembly 51 and the passage 57 of the shaft 53 to another desired location. If this fluid is under pressure, it can be utilized to dynamically load the resilient rings 81 and 83 against the slipper seal 85. In any event, the resilient rings 81 and 83 are radially compressed so that the surfaces 93 and 95 are urged into sealing engagement with surface 59 and the radial wall 65, respectively.

The seal assembly 51 is caused to rotate relative to the shaft 53 and the outer member 55 at a velocity intermediate the velocities of the shaft 53 and the outer member. As in the construction shown in FIG. 1, this is accomplished by controlling the surface finish of the walls 61, 63 and 65 and of the surface 59. The parameters useful in selecting surface finish discussed hereinabove with reference to FIG. 1 are equally applicable to the embodiment of FIG. 3. Thus, the embodiment of FIG. 3 possesses the capabilities of the embodiments of FIG. 1, and in addition provides for the transfer of fluid in either direction through the passage 57, the aperture 111, and the passage 73. Of course, the seal units 75 and 77 and the retainer 79 all rotate relative to the shaft 53 and the outer member 55.

Although exemplary embodiments of the invention have been shown and described, many changes, modifications and substitutions may be made by one having ordinary skill in the art without necessarily departing from the spirit and scope of this invention.

I claim:
1. A seal assembly for use between relatively rotatable inner and outer members comprising:
   a resilient element for circumscribing the inner member;
   a slipper seal for circumscribing the inner member and engageable with both of said members, said slipper seal holding said resilient element substantially out of contact with the inner and outer members; and
   means forming a driving connection between said slipper seal and at least one of said members to thereby cause said slipper seal and said resilient element to rotate together relative to both of the members at a velocity intermediate the velocities of the members to thereby reduce wear on the slipper seal.

2. A seal assembly as defined in claim 1 wherein said slipper seal is generally U-shaped and said resilient element is positioned between the legs of the U-shaped slipper seal, said U-shaped slipper seal opening generally axially.

3. A seal assembly as defined in claim 1 wherein said resilient element includes an elastomeric seal ring and said slipper seal is constructed of a plastic material.

4. A seal assembly as defined in claim 1 wherein said means for causing includes friction drive means between said slipper seal and said members.

5. A seal assembly as defined in claim 1 wherein said means for causing includes the surfaces of said slipper seal which engage the members, the coefficients of friction of said surfaces being selected to cause said members to drive said slipper seal at said intermediate velocity.

6. A seal assembly and associated structure comprising:

an inner member;

an outer member circumscribing said inner member, said members being relatively rotatable;

one of said members having first and second axially spaced, radial walls and a circumferential wall cooperating with said radial walls to define a circumferentially extending groove;

a seal assembly in said groove;

said seal assembly including first and second axially spaced elastomeric seal ring means circumscribing the inner member and a retaining element extending between said elastomeric seal rings means to maintain said elastomeric seal ring means in axially spaced relationship; and said seal assembly including first and second slipper seal means for substantially holding the first and second elastomeric seal ring means, respectively, out of contact with said members, said first and second slipper seal means engaging both of said members.

7. A seal assembly and associated structure as defined in claim 6 wherein the surface finish of the surfaces of said members which engage said slipper seal means are controlled so as to cause said seal assembly including said retaining element to rotate relative to both of said members at a velocity intermediate the velocities of said members.

8. A seal assembly and associated structure as defined in claim 6 wherein each of said elastomeric sealing ring means includes inner and outer elastomeric seal rings with said inner seal ring being positioned radially inwardly of said outer seal ring, said retaining element including a separating portion separating the inner and outer seal rings.

9. A seal assembly and associated structure as defined in claim 6 wherein said retaining element and said first slipper seal means cooperate to substantially completely confine said first elastomeric seal ring means.

10. A seal assembly and associated structure as defined in claim 6 including means for defining a passage through both of said members and said retaining element whereby material can flow through the seal assembly between said members, said passage extending through said retaining element intermediate said first and second elastomeric seal ring means.

11. A seal assembly and associated structure comprising:

an inner member;

an outer member circumscribing said inner member, said members being relatively rotatable;

one of said members having first and second axially spaced, radial walls and a circumferential wall cooperating with said radial walls to define a circumferentially extending groove;

a seal in said groove, said seal including a resilient element and a slipper element, each of said elements circumscribing the inner member;

said slipper element having circumferentially extending inner and outer surfaces engaging cooperating surfaces on the inner and outer members, respectively, said slipper element substantially isolating the resilient elements from contact with said members; and the surface finish of said cooperating surfaces of said members being selected so as to cause said seal to rotate relative to both of said members at a velocity intermediate the velocities of said members.

12. A seal assembly and associated structure as defined in claim 11 wherein the velocity of said seal is approximately one-half the relative velocity between said members.

13. A seal assembly defined in claim 11 wherein said slipper element includes inner and outer leg portions defining said circumferentially extending inner and outer surfaces, respectively, said resilient element being at least partially between said leg portions and urging at least one of said inner and outer surfaces into engagement with the associated member, one of said cooperating surfaces being said circumferential wall.

14. A seal assembly as defined in claim 13 wherein said slipper element is constructed of a plastic material and said resilient element is constructed of elastomeric material, said leg portions being joined by a generally radially extending web which generally confronts one of said radial walls.